United States Patent [19]

Slawson

[11] 4,183,371
[45] Jan. 15, 1980

[54] THERMAL VALVE

[75] Inventor: Richard S. Slawson, Barrington, R.I.

[73] Assignee: G. W. Dahl Company, Inc., Bristol, R.I.

[21] Appl. No.: 865,016

[22] Filed: Dec. 27, 1977

[51] Int. Cl.² ............... F16K 17/38; A62C 37/06
[52] U.S. Cl. .................................. 137/75; 74/2; 137/72; 169/19
[58] Field of Search ............... 137/72, 73, 75, 76; 169/38, 40, 41, 42, 19; 74/2

[56] References Cited

U.S. PATENT DOCUMENTS

| | | | |
|---|---|---|---|
| 306,662 | 10/1884 | Stratton | 137/72 X |
| 998,507 | 7/1911 | Hasty | 137/76 |
| 1,126,914 | 2/1915 | Sullivan | 137/75 |
| 2,137,685 | 11/1938 | Gillen | 137/77 |
| 3,587,747 | 6/1971 | Romero et al. | 169/42 X |
| 3,659,624 | 5/1972 | Kelly et al. | 137/75 |
| 3,916,930 | 11/1975 | Erickson | 137/75 |

Primary Examiner—Martin P. Schwadron
Assistant Examiner—Richard Gerard
Attorney, Agent, or Firm—Salter & Michaelson

[57] ABSTRACT

A thermal responsive valve including a housing in which a valve member is normally urged from a first to a second position but restrained from such movement by restraining means including a pair of pins adapted to engage a portion of the member and be laterally spread apart against the frictional action of retaining means. The retaining means are in turn supported by a portion of a fusible link so when the temperature reaches a predetermined level, the fusible link melts and no longer supports the retaining means so that the pins may fall from restraining contact with the member by gravity and thus permit the member to move to the second position. The above indicated frictional coaction enables a relatively lightweight or weak fusible link to restrain a member against a relatively strong urging force by the mechanical advantage brought about by the coaction of the pins against the retaining means. Such mechanical advantage may further be increased by forming the member contacting portions of the first member of a conical shape.

19 Claims, 6 Drawing Figures

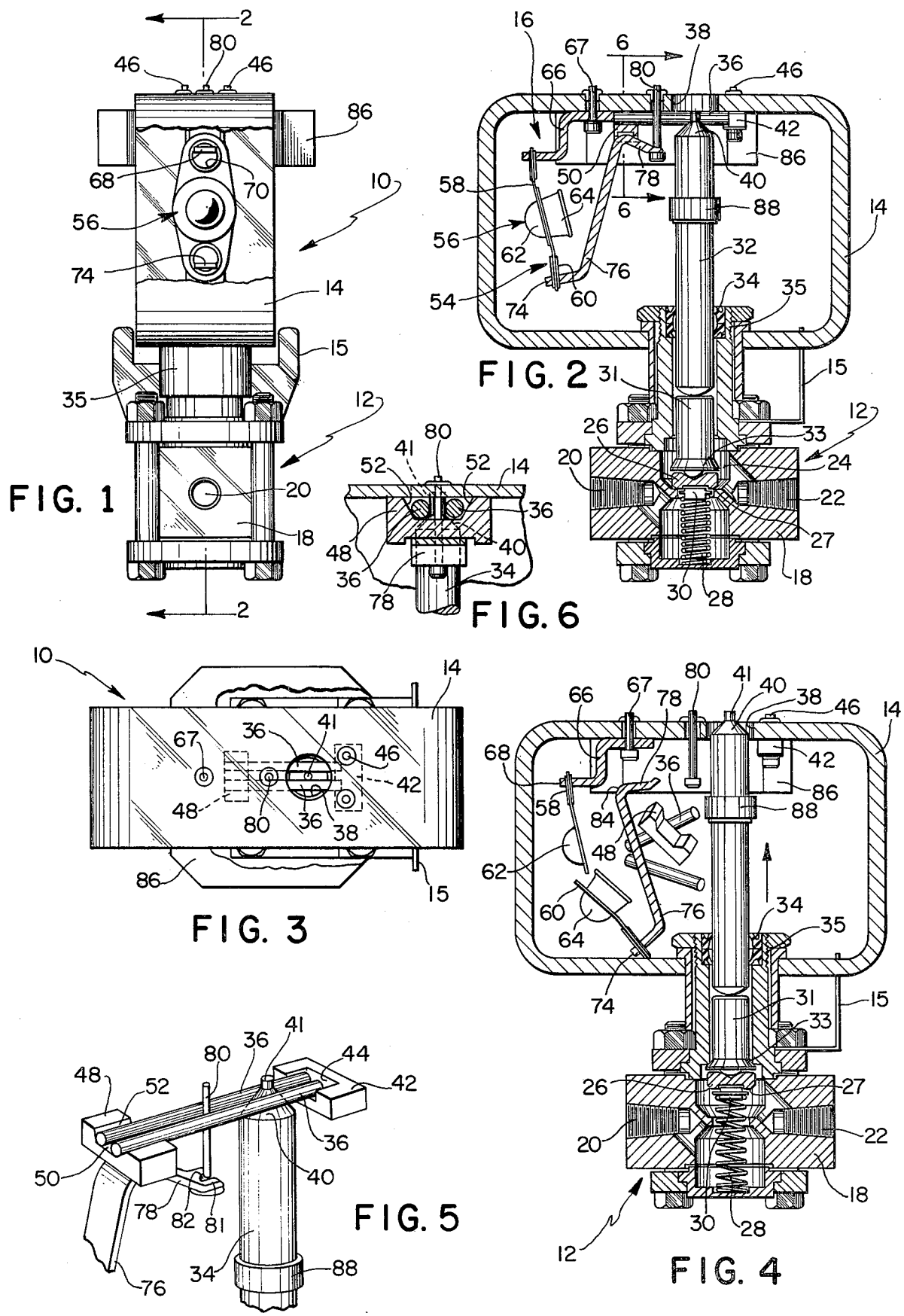

THERMAL VALVE

BACKGROUND AND SUMMARY OF THE INVENTION

This invention generally relates to valves and more particularly to a valve construction which will automatically either open or close in response to a predetermined ambient temperature level. Thermally responsive values of this type are in common use and include, for examples, those which assure the shutdown of lines carrying flammable or toxic materials in the event of a fire and those which will activate a sprinkler system.

Valves of this type generally include a housing having a flow path defined therethrough in which a valve member such as a stem or stem portion is aligned to move between first and second operational positions to either initiate or shut off fluid flow dependent on the particular type action desired. Thus, for a sprinkler system the first or normal position of the valve member would be in a closed attitude and movable to a second or operational position wherein the valve member permits fluid flow therethrough. The opposite action would, of course, take place with shut off type valves.

A spring or other resilient means is utilized to urge the valve to its second position, but the thrust of such resilient means is normally counteracted by restraining means engaged with the member so as to normally block is movement to the second position, i.e. the open position in a sprinkler type system. In order that the valve assembly may move to its second or open position, such restraining means includes a fusible link, the arrangement being such, that so long as the link is intact, the valve mechanism is maintained in its first position. Upon fusing or melting of the link due to the presence of a predetermined ambient temperature level, the restraining means is released and the movement of the valve member to the second or operational position is automatically achieved by reason of the urging action of the spring.

An example of one such device is that shown in U.S. Pat. No. 3,916,930 issued Nov. 4, 1975. Therein, a lever arm which forms a portion of the fusible link is in direct contact with the valve member to restrain its movement to the second position. In this and other similar constructions, it is necessary to couple or match the capability of the fusible link to withstand the mechanical force tending to separate such with the strength of the force applied thereto by the urging means, i.e. the spring force. Accordingly, various size and strength link assemblies are produced, each fusible at a particular temperature level for application with different size and strength valves. Thus, in order to restrain the relatively high urging force, as found in a relatively large valve, it would be necessary to couple with such devices, a relatively large and accordingly more expensive link assembly. In accordingly would be more desirable if relatively lightweight and, accordingly, less expensive link assemblies could be utilized for a wider range of valve applications, particularly those having relatively strong urging springs. It is accordingly a primary object of the present invention to produce a thermally responsive valve mechanism in which the restraining means normally acting to prevent movement of the valve member to the second or operational position includes in part, frictional forces which must be overcome and thus through the mechanical advantage created thereby, enables a relatively lightweight fusible link assembly to maintain the valve member in the first or normal position thereof against the urging of a relatively strong force.

Another object of the present invention is the provision of a thermally responsive valve mechanism in which the force applied by restraining means normally preventing movement of a valve member from a first to a second position is adjustable in such a manner that a single fusible link assembly may be utilized with valve assemblies having different strength urging means.

A still further object of the present invention is the provision of a thermally responsive valve mechanism having high reliability and trouble-free performance, which is not overly complex in construction and which enables utilization of presently available components.

These and other objects of the present invention are accomplished by the novel restraining means engaged with the movable member of a valve assembly so as to normally block movement to a second position and including thermally releasable tension means having an intermediate fusible link supporting said restraining means in a first or normal position, which restraining means further includes movable means in frictional engagement with retaining means an movable thereacross such that a mechanical advantage created thereby permits a relatively mechanically weak link to withstand the force applied thereto by a relatively strong valve member urging force whereby when such link fuses due to the presence of a predetermined level of ambient temperature, the tension exerted on such link causes it to separate and, thus, release the restraining means and in turn permit the valve member to move by action of the urging means to the second position.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is an end elevational view of a thermal responsive valve constructed in accordance with the present invention;

FIG. 2 is a side sectional view thereof taken along the line 2—2 of FIG. 1 and showing the valve in its first or normal position;

FIG. 3 is a top plan view thereof;

FIG. 4 is a side sectional view similar to FIG. 2 of the drawing but showing the valve in its second or operational position;

FIG. 5 is a partial perspective view of the valve assembly showing in particular the interaction between the restraining means and the movable valve portion; and FIG. 6 is a sectional view with parts removed for purposes of clarity taken along the line 6—6 of FIG. 2.

DESCRIPTION OF THE INVENTION

Referring now to the drawing, the thermally responsive valve mechanism shown generally at 10 includes a valve 12 having a housing 14 connected thereto as by the bracket 15 and from which restraining means 16 is mounted. The valve 12 includes an elongated block or body 18, entrance and exit flow channels 20, 22 and a valve chamber 24. The particular valve construction shown is that of a sprinkler valve and accordingly, its first or normal position is such that a plug assembly 26 is normally held in a closed or fluid sealing position against a lower valve seat 27 within the chamber 24 and, accordingly prevents fluid from passing therethrough. The plug 26 is normally urged upwardly by action of a spring 28 acting through a cooperating spring button 30 in such a manner to continually urge a stem rocker 31 and cooperating valve stem 32 upwardly into an open position of the valve as best shown in FIG. 4 wherein the plug engages an upper valve seat 33. Sealing means 34 prevents fluid from leaving the valve via the bonnet 35 from which the valve stem 32 projects into the housing and into contact with the restraining means 16 as will hereinafter be more clearly seen.

In order to maintain the valve 12 in its first or normal position illustrated in FIG. 2 against the action of the spring 28, the restraining means 16 is adapted to contact the terminal end of the movable valve member which extends into the housing 14. The restraining means 16 in turn includes movable means in the form of a pair of pins 36 which are adapted to span an opening 38 in the housing 14 and contact opposite sides of the terminal portion 40 of the stem 32. The side thereof may be conical or tapered and the pins 36 are also preferably slightly laterally spaced from each other in their normal position and a head or point 41 projecting beyond the tapered surface 40 extends into such spacing between the pins. A block 42 having an open ended pocket 44 is adapted to receive one end of both the pins 36. The block 42 may be secured by any suitable mewans such as a screw 46 depicted to the underside of the upper portion of the housing 14. The other ends of the pins 36 are adapted to engage a pin bridge 48 having a generally trapezoidal shaped cut out or trough including a base 50 and upwardly outwardly slanted ramp portions 52 on opposite sides thereof.

As will be best explained hereafter, the pins 36 are accordingly positioned such that a terminal portion 40 of the valve stem 32 by means of the urging action of the spring 28 projects between the contacts portions of the pins. Since the pins are held at one end thereof by means of the pocket 44 and their engagement with underside portions of the housing 14, the upward movement of the member tends to laterally outwardly spread the pins 36 at the other ends thereof and force such upwardly along the tapered ramps 52. Such action results in sliding or rolling friction dependent on the shape of the pins, which frictional forces need to be overcome to enable further upward movement of the member 32 to take place. Such action results in a mechanical advantage being built into the restraining system 16 and through which the urging action of the spring 28 acts.

The pin bridge 48 is maintained in position against the pins 36 by a thermally releasable tension assembly 54 including a fusible link shown generally at 56. Such link comprises an upper part 58 and a lower part 60 each having cup-shaped portions 62, 64 respectively, fused together by suitable means whereby the presence of a predetermined level of ambient temperature will cause the fused connection between parts 58 and 60 to melt, and accordingly readily separate. The upper part 58 is held in fixed position by means of a fixed support 66 suitably secured to the housing 14 by means of a screw 67 and includes an end 68 adapted to interengage with an opening 70 within the upper part 58. On the other hand, the lower part 60 which forms the opposite end of the link 56 is provided with a similar opening 72 adapted to receive an end portion 74 of a rigid lever arm 76. Such lever arm 76 places the fusible link 56 under tension by reason of being suspended at its other end 78 from an adjustably mounted screw 80 attached to the housing 14 and extending between the pins 36 as best shown in FIG. 5. This other end 78 is provided with a bifurcated terminus 81 defining a slot 82 which in turn is adapted to receive the shaft of the screw 80. Lever arm 76 is further provided with a reverse curved portion 84 which forms a fulcrum and which is adapted in the normal positioning of the restraining means 16 to engage the bottom of the pin bridge 48 to maintain such in a position and so as to support the other ends of the pins 36. The screw 80 is movable upwardly and downwardly to accordingly place the fusible link 56 under the proper tension.

The manner in which the device operates is best seen by sequential reference to FIGS. 2 and 4 of the drawing. In FIG. 2, the restraining means 16 is in its normal position with the fusible link assembly 54 acting to support the retaining means in the form of the pin bridge 48 so as to support the pins 36 in position for contact by the terminal portion 40 of the member 32 as such is urged upwardly by action of the spring 28. In this position the tapered walls 40 engage inner side portions of the pins 36 and tend to force the pins upwardly and outwardly apart from each other. Such action, assuming the urging force of the spring 28 is strong enough to cause some movement of the pins, causes the other end of the pins supported by the pin bridge 48 to be forced upwardly across the inclined ramps 52. This requires that substantial force be utilized to overcome the friction inherent in such movement. Further by regulating the angle of the ramps 52, the frictional forces required to be overcome to provide some movement of the pins 36, can be increased or decreased according to the degree of mechanical advantage desired to be built into the system. Similarly, the taper of the surface 40 of the member 32, can be similarly altered to accordingly make it more or less difficult to spread the pins apart, that is, by modifying the resultant vector force direction in which the spring force acting upon the stem 32 is transmitted to the pins. The combination of these frictional forces, that is, the coaction of the surface 40 which the pins 36 and the coaction of the pins 36 against the ramps 52, creates certain inherent frictional resistance which needs to be overcome prior to the application of further tension upon the tension support 76, and accordingly in turn the fusible line 56.

In this manner, then, a relatively lightweight and, accordingly, a relatively mechanically weak link assembly may be utilized to support relatively strong urging forces applied to the valve member 34. Also, inasmuch as such frictional forces may be varied by changing the taper of surface 40 or the taper of surfaces 52 or both, a standard weight fusible link 56 may be utilized in several valve applications wherein different strength springs 28 are utilized and thus eliminates the prior art necessity of more closely matching the mechanical or physical strength of a fusible link assembly with the strength of the spring force utilized in the valve assembly.

Turning now to FIG. 4 of the drawing, when the ambient temperature surrounding the valve mechanism 10 has reached a predetermined level, the fusible link 56 melts allowing the cup-shaped portions 62,64 to slip past each other and enabling the tension support 76 to fall by gravity within the housing 14. A shield 86 attached to the housing in any suitable manner in part surrounds the restraining means 16 and serves as a safety barrier so as to deflect the falling portions of the restraining means 16 into the housing 14 and away from contacting adjacent equipment or personnel. The fall of the support 76 enables the pin bridge 48 to fall which in turn no longer supports the pins 36. This permits the pins to be freely forced apart and thereafter slide from the pocket 44. The valve member 34 is thus free to move to its full upward position through the opening 38 wherein the plug assembly 26 contacts the upper seat 33 and permits the flow of fluid through the valve body 12. In order to restrain the stem 32 from moving entirely out of the bonnet 35, a stop 88 of a diameter larger than that of the opening 38 is provided so that in the event the stem 32 is forced upwardly by the spring action a greater distance than necessary to seat the stem rocker 31 in its upper position, the stop 88 will abut peripheral portions of the opening 38 to prevent such action.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A thermal responsive mechanism for controlling the movement of one member with respect to another member between a first or normal position and a second or operational position thereof such as the stem and seat portions respectively of valve constructions, comprising means for continually urging said one member from said first to said second position, restraining means engaged with said one member so as to normally block such movement to said second position and including thermally releasable tension means having a fusible link supporting said restraining means in said normal blocking position, said restraining means further including movable means positioned in engagement with said one member by retaining means, said movable means independently movable by said one member against frictional forces imparted thereto by the cooperation of said movable means with said retaining means, said retaining means supported in said normal blocking position by said tension means, whereby when said link fuses due to the presence of a predetermined degree of heat, the tension exerted thereon causes said link to separate, thus releasing said tension means and permitting displacement of said retaining means and movable means so as to permit said urging means to move said one member to said second position.

2. The mechanism set forth in claim 1, said movable means comprising at least one longitudinally orientated pin having a portion thereof disposed in lateral contact with said one member, said retaining means including a pin bridge supporting a portion of said pin, said bridge having an elevated ramp which said portion of the pin is adapted to frictionally engage so that the force of said tension means available to restrain movement of said one member is multiplied through said restraining means so that a relatively weak tension force is capable of restraining said one member against operational movement from a relatively large urging force upon said one member.

3. The mechanism set forth in claim 2, including means for supporting one end of said pin for pivotal movement of said pin portion with respect to said ramp.

4. The mechanism set forth in claim 2, said movable means including a pair of generally parallel pins.

5. The mechanism set forth in claim 4, said pins retained in position at first ends thereof so as to permit lateral movement of second opposite ends thereof apart from each other and in frictional engagement with a pair of opposed elevated ramps, said pins spanning and contacting a portion of said one member.

6. The mechanism set forth in claim 5, said portion of said one member being conically shaped wherein the apex thereof is adapted for disposition between said pins and opposed slanted sides thereof are adapted to frictionally contact said pins to impart an upwardly outwardly composite force to said pins thus tending to laterally separate said pins against the frictional force imparted thereto by said elevated ramps.

7. The mechanism set forth in claim 6, wherein said one member is a valve stem portion having one end operatively associated with said urging means and the other end thereof comprising said conically shaped portion thereof.

8. The mechanism set forth in claim 2, wherein said pin bridge is supported in position by said thermally releasable tension means when said one member is in said first or normal position and wherein separation of said link permits said pin bridge to fall, thus releasing said pin, and accordingly permitting said one member to move to said second or operational position.

9. A thermal responsive valve comprising a valve body, a member within said body movable between a first or normal position and a second position, means normally urging said movable member towards said second position, restraining means at least partially mounted within an exterior housing associated with said body and including movable means and retaining means for said movable means engaged with said member so as to normally block movement thereof to said second position and thermally actuated means mounted inside of said housing normally maintaining said movable means in said blocking position, said thermally actuated means comprising a fusible link, first means holding one end of said link, and second means holding the other end of said link, said first and second means cooperating so as to hold said link under tension, said second means comprising a rigid lever arm having a fulcrum portion, one end of said arm engaging said other end of said link, and means releasably holding the other end of said arm in spaced relation to said housing with said fulcrum portion engaging said retaining means and a portion of said member operatively engaging said movable means, said movable means independently movable by said member against frictional forces imparted thereto by the cooperation of said movable means with said retaining means, whereby when said link fuses due to the presence of a predetermined degree of heat, the tension exerted thereon causes said link to separate, thus releasing said tension means and permitting displacement of said retaining means and movable means so as to permit said urging means to move said one member to said second position.

10. The thermal responsive valve of claim 9, said movable means including at least one longitudinally oriented pin having a portion thereof disposed in lateral contact with said member in turn being a valve stem portion extending into said housing, said retaining means including a pin bridge frictionally supporting a portion of said pin against movement thereacross, so that the force of said tension means available to restrain movement of said one member is multiplied through said restraining means so that a relatively weak tension force is capable of restraining said one member against operational movement from a relatively large urging force upon said one member, said pin bridge supported in said normal position by said fulcrum portion.

11. The thermal responsive valve of claim 10, said movable means including a pair of generally parallel pins positioned for lateral restraint at first ends thereof and adapted to frictionally contact a pair of opposed elevated ramps of said pin bridge at locations distal from said first ends, said valve stem having a portion thereof adapted to contact said pins intermediate said ramps and said first ends thus exerting an upward generally equal force upon said pins so as to laterally separate said second ends of said pins against the frictional force imparted thereto by said ramps.

12. The thermal responsive valve of claim 11, and said portion of said one member being conically shaped wherein the apex thereof is adapted for disposition between said pins and opposed slanted sides thereof are adapted to frictionally contact said pins to impart an upwardly outwardly composite force to said pins thus tending to laterally separate said pins against the frictional force imparted thereto by said elevated ramps.

13. The thermal responsive valve of claim 12, said valve stem portion being the head portion thereof, said head adapted to contact said pins intermediate said releasable holding means and said pin first ends.

14. The thermal responsive valve of claim 11, including a pin pocket supported by said housing and adapted to receive said first pin ends, said pins free to fall from said pocket when no longer cooperatively supported by said pin bridge at locations distal from said first ends.

15. The thermal responsive valve of claim 11, said pin bridge adapted to support said pin second ends.

16. The thermal responsive valve of claim 11, said pin bridge defining a trapezoidal shaped trough in cross section, said pins adapted to engage the base of said trough and be forced upwardly outwardly against the sides thereof by the force imparted thereto by said valve stem.

17. The thermal responsive valve of claim 11, said releasable holding means being adjustable and comprising a screw threadably attached to said housing with the head of said screw spaced therefrom, said lever arm other end having a slot freely receiving said screw, whereby tightening of said screw causes said arm to pivot about said fulcrum portion to increase the tension on said link, and vice versa.

18. The thermal responsive valve of claim 17, and said first holding means comprising a rigid metallic strap having a first end secured to said housing and a second offset end spaced from said housing, said second end holding said one end of said link in spaced relation to said housing.

19. The thermal responsive valve of claim 11, said housing including a rigid shield surrounding said restraining means.

* * * * *